United States Patent [19]

Verhagen

[11] 4,140,885
[45] Feb. 20, 1979

[54] MODULAR INTERCHANGE TERMINATION SYSTEM

[75] Inventor: Arie Verhagen, Whitby, Canada

[73] Assignee: Bunker Ramo Corporation, Oak Brook, Ill.

[21] Appl. No.: 736,030

[22] Filed: Oct. 27, 1976

Related U.S. Application Data

[63] Continuation of Ser. No. 480,852, Jun. 19, 1974, abandoned.

[51] Int. Cl.² ........................ H04Q 1/06; H04Q 1/14
[52] U.S. Cl. .................................. 179/98; 339/18 B; 339/18 C
[58] Field of Search ............... 179/98, 99, 91 R; 174/72 R, 72 A; 339/18 R, 18 B, 18 P, 17 C, 18 C, 17 F

[56] References Cited

U.S. PATENT DOCUMENTS

| | | | |
|---|---|---|---|
| 3,450,950 | 6/1969 | Tarrats | 361/415 |
| 3,566,004 | 2/1971 | Creedon | 179/98 |
| 3,573,373 | 4/1971 | Mullin et al. | 179/98 |
| 3,761,771 | 9/1973 | Thompson | 339/97 |
| 3,763,325 | 10/1973 | Kapel et al. | 179/98 |
| 3,781,758 | 12/1973 | Anderson | 339/255 |
| 3,869,582 | 3/1975 | Humphrey et al. | 179/98 |
| 4,018,997 | 4/1977 | Hoover et al. | 179/98 |

FOREIGN PATENT DOCUMENTS

| | | | |
|---|---|---|---|
| 813267 | 9/1951 | Fed. Rep. of Germany | 179/98 |
| 1248115 | 8/1967 | Fed. Rep. of Germany | 179/98 |
| 359166 | 2/1962 | Switzerland | 179/98 |

Primary Examiner—Kathleen H. Claffy
Assistant Examiner—Gerald L. Brigance
Attorney, Agent, or Firm—William Lohff; F. M. Arbuckle

[57] ABSTRACT

A termination system, in particular for key telephones, is constructed on a modular basis and includes programmable termination fields for flexibility in providing and altering key telephone functions, and plug-in connection of the telephone instruments at a termination zone for electrically moving a telephone from one location to another without the necessity of disconnecting and reconnecting the individual conductors associated with each telephone instrument.

26 Claims, 10 Drawing Figures

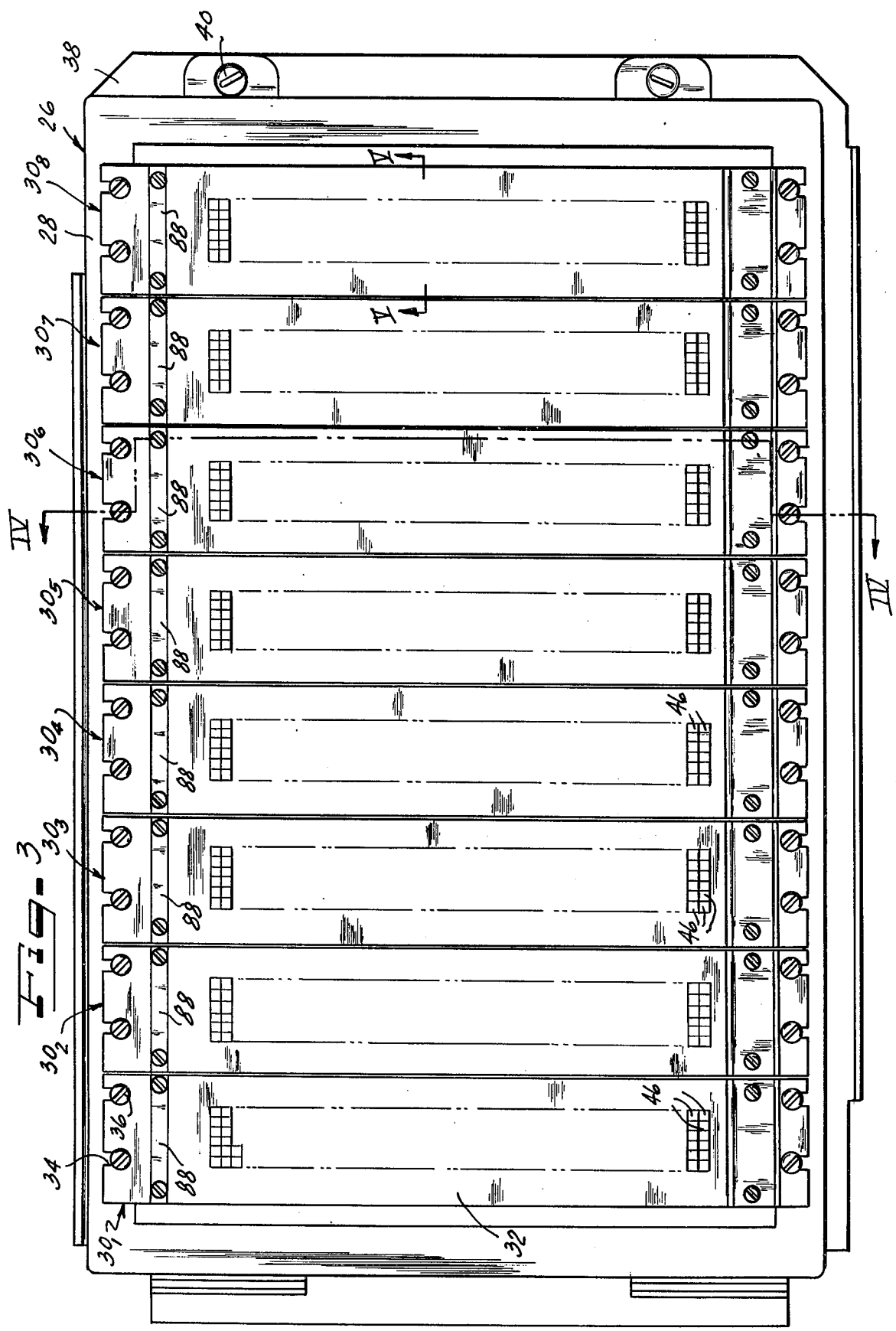

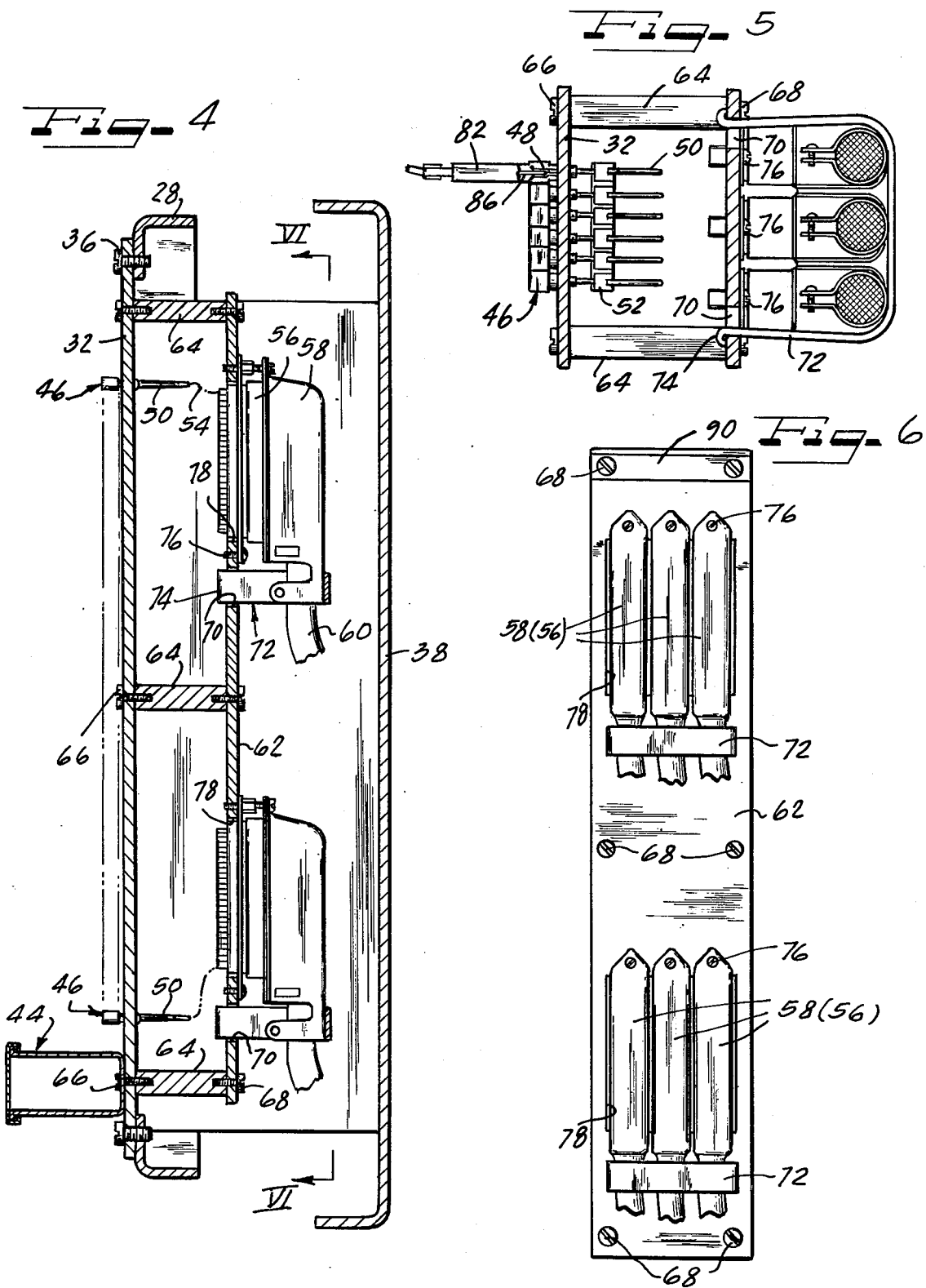

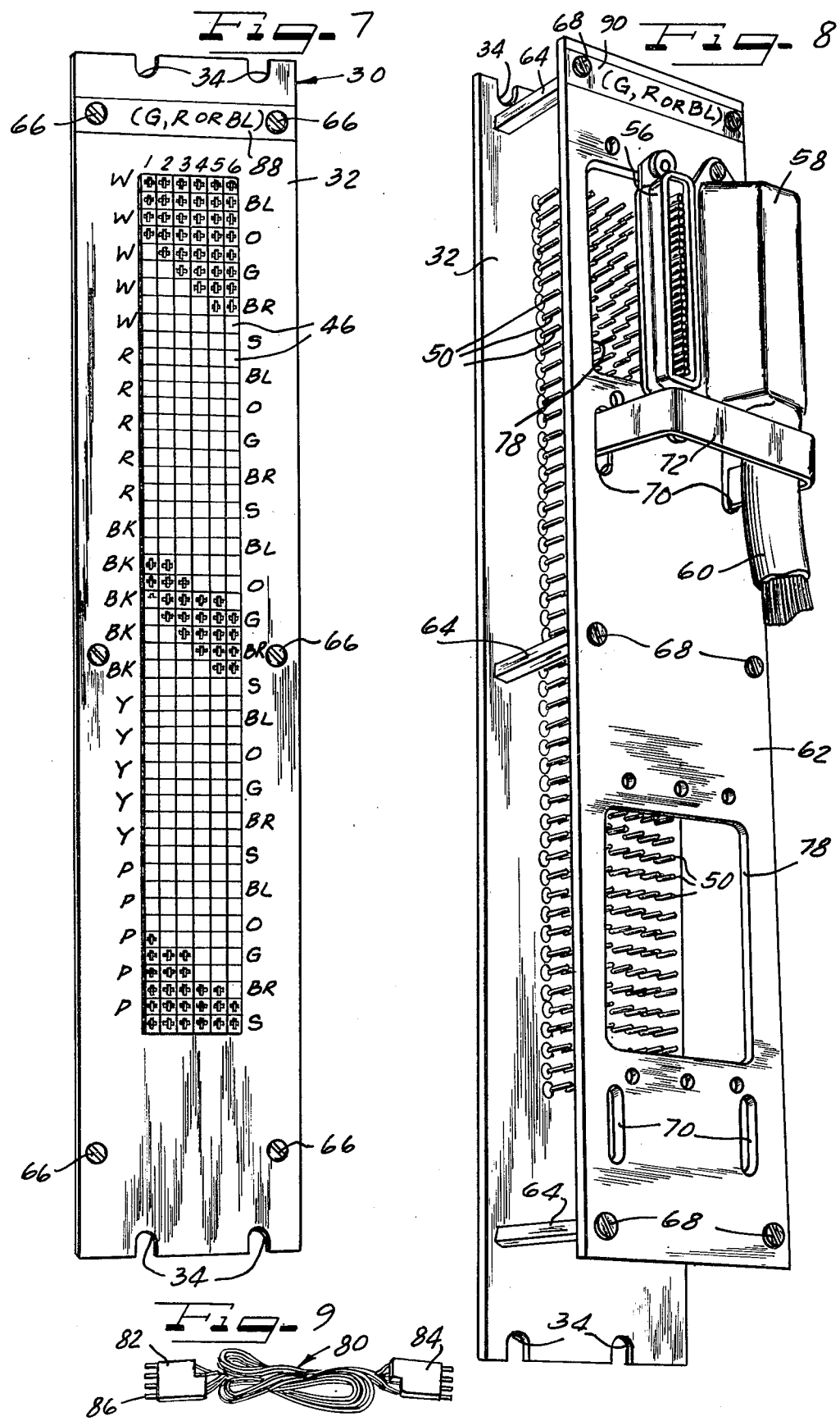

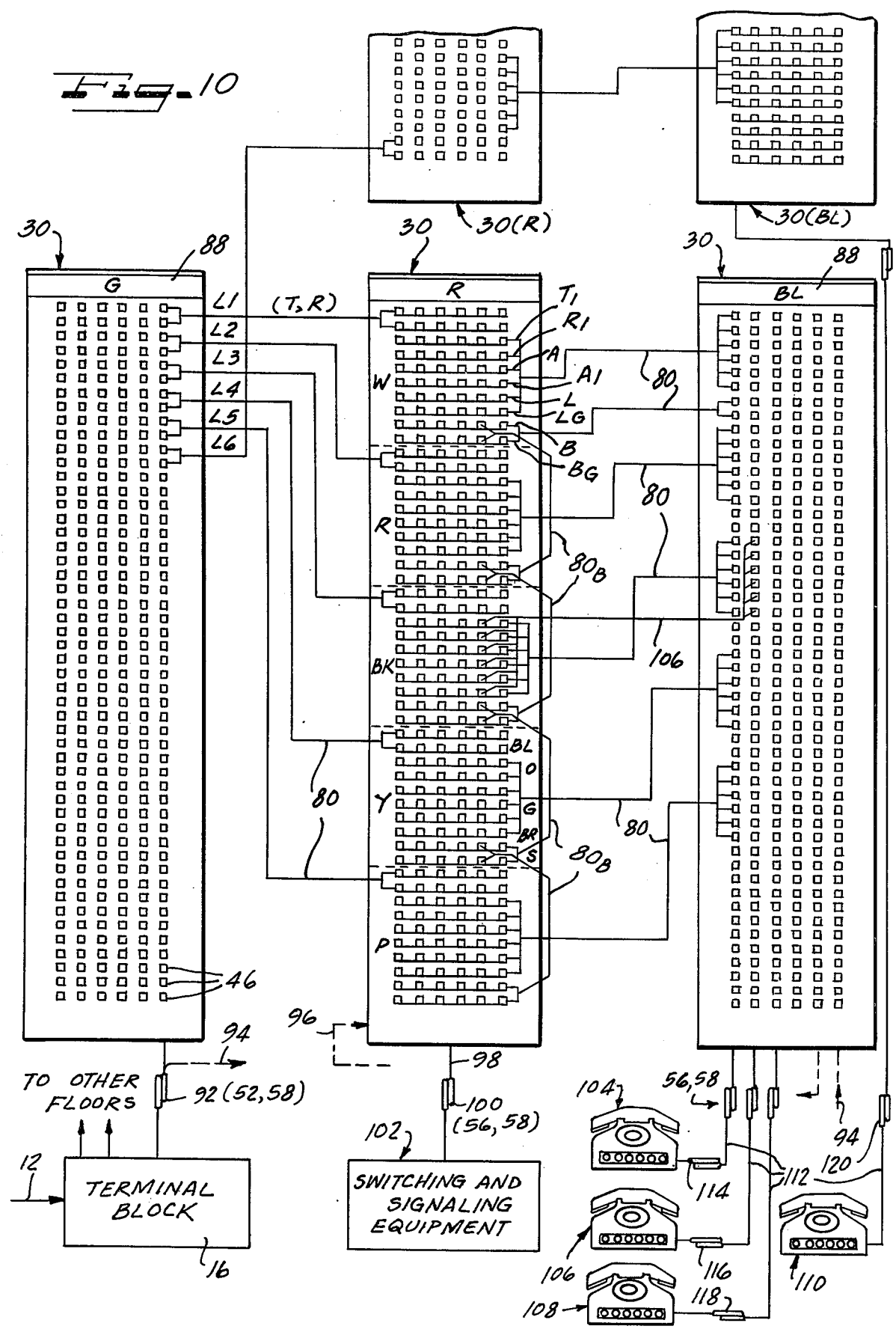

MODULAR INTERCHANGE TERMINATION SYSTEM

RELATED APPLICATION

This is a continuation, application of application Ser. No. 480,852, filed June 19, 1974 now abandoned.

BACKGROUND OF THE INVENTION

1. Field of the Invention

This invention relates to a termination system for telecommunication devices, and in particular to a modular interchange termination system for key telephones.

2. Description of the Prior Art

Telephone termination systems, particularly those associated with key telephones in a business office environment, have heretofore required a great deal of time and expense in connection with installation, maintenance, and line and function alterability.

For example, in such termination systems, incoming trunks are extended, usually underground, from a central office to a distribution frame usually located in a basement or other utility area of an office building. The incoming lines are then fed to second terminal blocks located in individual floor riser closets for connection to the associated key telephones by way of switching and signaling equipment also located in each closet which operates in conjunction with the key telephones to selectively provide multi-line connection and the associated functions of holding, ringing, lamp lighting and the like.

Inasmuch as the terminal blocks and switching and signaling equipment are located in the aforementioned floor closets and as each key telephone requires a multiplicity of conductors for each line connectible thereto and its associated functions for holding, ringing, lamp lighting and the like, and as the key telephones are located at various positions throughout the building, it is readily apparent that a great deal of time and expense is involved in installing "raw" cable, which by way of example usually comprises 25 pair solid conductor color coded insulated cable, between the second terminal blocks and the key telephones throughout a building.

The use of permanent or semi-permanent connections, including lugs and installation-piercing terminals, such as provided by the Western Electric 66A or 66B terminal blocks, gives rise to an additional problem concerning the flexibility of prior systems. For example, if four incoming lines are available and a key telephone has access to two of the four lines, and access is to be altered to three available lines, additional connections must be individually and physically performed at the terminal blocks. This problem is compounded if one of the original two lines is not to service the key telephone. This means that the function conductors associated with the line must be disconnected. With personnel changes in a customer's facility, and with changes of customers, maintenance of the connection system may become a problem. Also, when a customer acquires additional floor space, or shifts personnel to different areas of a given floor space, the function conductors associated with each key telephone must be disconnected and/or connected to different terminals of the terminal blocks. This, of course, requires additional installation and maintenance time for the termination system, not to mention interference with the subscriber's business activities.

SUMMARY OF THE INVENTION

The primary object of the present invention, therefore, is to provide a new and improved telecommunication device termination system.

A more specific object of the invention is to provide a modular interchange termination system, in particular for key telephones, in which the available lines and associated key telephone functions may be uniquely programmed and altered.

Another object of the invention is to provide an improved termination system for key telephones and the like in which the particular key telephone service of a certain individual may easily be transferred to another key telephone to accommodate personnel relocation.

Another object of the invention is to provide a modular interchange termination system which is easily programmable and easily altered so as to provide individuals with different telephone functions for key telephones and the like including secretarial signaling, loud speaking service, private lines, etc.

Another object of the invention is to provide a modular interchange termination system which is easily maintained, through the utilization of indicia, including color coded conductors and color coded termination modules.

Still another object of the invention is to reduce the extensive multi-conductor cable waste heretofore experienced in making the necessary connections between key telephones and the associated closet terminal blocks.

A modular interchange termination system, according to the invention, includes a terminal block for receiving the incoming lines to an office building from a telephone central office. This terminal block is to be located in a utility closet of the basement or other utility area of the office building. The individual lines often called house line or house local are then extended upwardly through the building through risers which may advantageously be located adjacent to elevator shaft or the like for distribution to the different floors of the office building.

In modern construction, a riser closet of some type is usually located on each floor adjacent to or in the risers. A modular interchange termination system is located in each of these closets and serves the key telephones about the respective floor of the building. Inasmuch as any floor of a building may have a single customer or may house several customers, raw cable is extended from the modular interchange termination system to specific locations of a floor for connection to the individual telephone instruments. This is a permanent type wiring and usually extends through conduits in the floor, walls and/or ceiling. The raw cable is connected to the termination system by means of separable connectors having the necessary number of individual matable contacts.

The heart of the modular interchange termination system includes modules having a plurality of programmable contacts which may be selectively interconnected by means of plug-in jumper connections. The contacts of each module are arranged in horizontal and vertical rows which bear similar indicia in the form of color coding to aid in the identification of individual lines which bear corresponding color coding and thereby ease installation and maintenance.

As will be more fully understood from the detailed description below, the modules are associated with different types of equipment including the incoming lines, the switching and signaling equipment, and the key telephones.

The first module, hereinafter called the "green field", is associated with the incoming lines and connected thereto by a separable connector and the terminal block. The green field is connected to one or more second modules, hereinafter called the "red field".

Each red field receives the incoming lines from the green field, extends the incoming lines to the switching and signaling equipment via a cable having a separable conductor, and extends the telephone function lines to one or more third modules, hereinafter called a "blue field". Each incoming line served by a red field may be selectively connected to one or more key telephones by plug-in jumper conductors to a blue field.

Each key telephone is connected to the contacts of a vertical row of a blue field. Therefore, the accessibility of any particular key telephone to an incoming line is readily accomplished by merely jumpering with plug-in conductors from the contacts of the red field associated with that line to contacts in a vertical row of the blue field associated with the key telephone. Each key telephone is connected to the respective contacts of a vertical row of a blue field by way of a separable connector which is interchangeable with the other separable connectors associated with the other key telephones. Therefore, a telephone may be disconnected from a vertical row of the blue field and a telephone at a different location may be connected to that row to accommodate relocation of personnel.

The separable connectors between the green field and the terminal block and between the red field and the switching and signaling equipment provides additional flexibility for the system in that a quick disconnect and reconnect may be made so that service personnel may perform tests in either direction.

BRIEF DESCRIPTION OF THE DRAWINGS

The above and other objects, features and advantages of the invention, its organization, construction and operation will be best understood from the following detailed description of a preferred embodiment of the invention, taken in conjunction with the accompanying drawings, on which:

FIG. 3 is a front elevational view of the apparatus employed in a modular interchange termination system, shown with a front cover removed;

FIG. 4 is a sectional view taken generally along the line IV—IV of FIG. 3;

FIG. 5 is a sectional view taken substantially along the line V—V of FIG. 3;

FIG. 6 is a rear view of a portion of the apparatus of FIG. 3 as viewed in the direction VI—VI of FIG. 4;

FIG. 7 is a pictorial illustration, at a slight angle, of the front panel of a module;

FIG. 8 is a pictorial illustration, as seen generally from the rear, of a module which may be employed in practicing the present invention;

FIG. 9 is an illustration of a typical plug-in set of jumper conductors for use in interconnecting between the green, red and blue fields; and FIG. 10 is a schematic illustration of a module interchange termination system constructed in accordance with the invention;

DESCRIPTION OF THE PREFERRED EMBODIMENT

Figure 1:
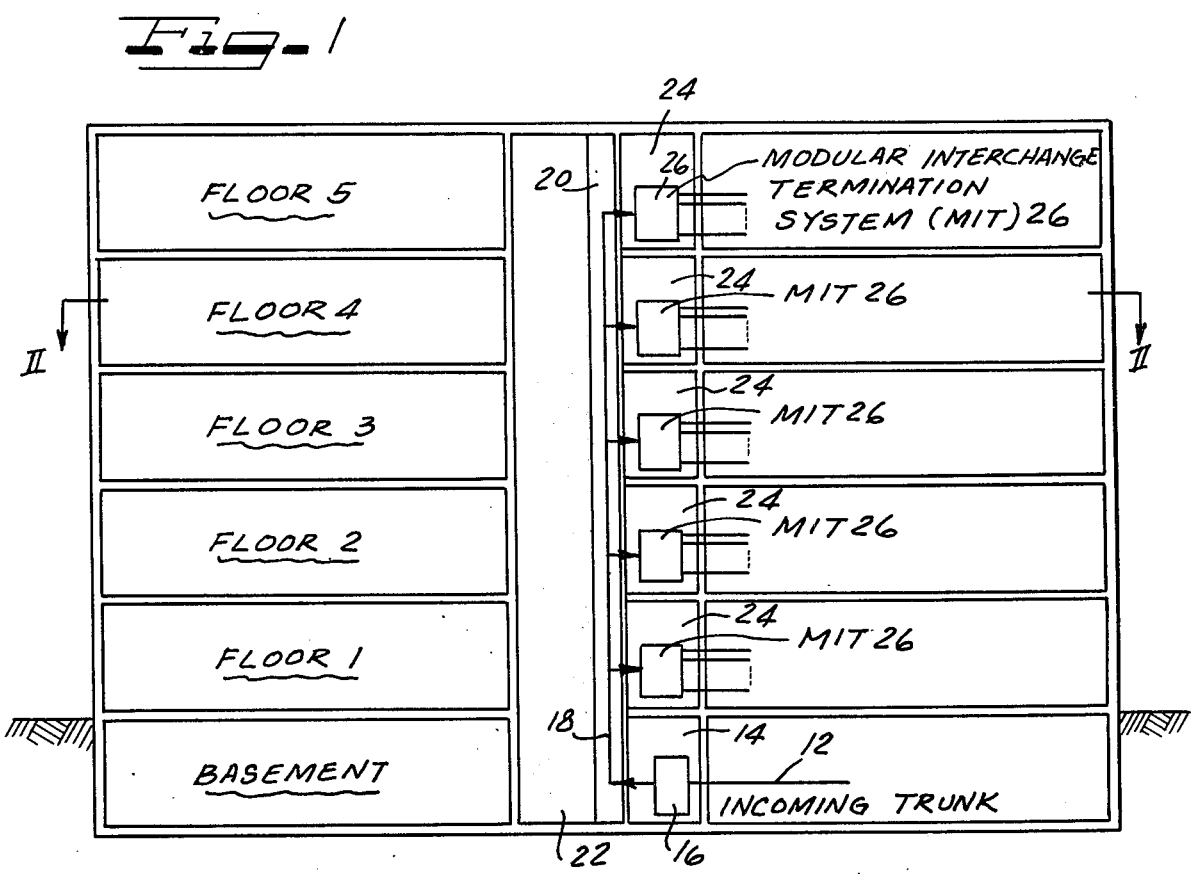
FIG. 1 is a schematic illustration of an office building having a modular interchange termination system according to the invention.

Referring to FIG. 1, a five story building is generally illustrated at 10 as receiving an incoming trunk 12 into a utility area 14 which houses a terminal block 16. The terminal block 16 may be any well known type and merely serves as a connection point between the telephone central office and the telephone equipment of the building 10. The incoming lines 18, in the form of a multi-conductor cable, extends through a riser 20 substantially the entire height of the building 10. In modern buildings having an elevator shaft, such as a shaft 22, the riser 20 is usually and advantageously provided adjacent the elevator shaft.

At each floor the subscriber lines associated with the particular directory numbers of the subscribers on that floor extend into a utility closet 24 where they are connected to a modular interchange termination system for the particular floor.

Figure 2:
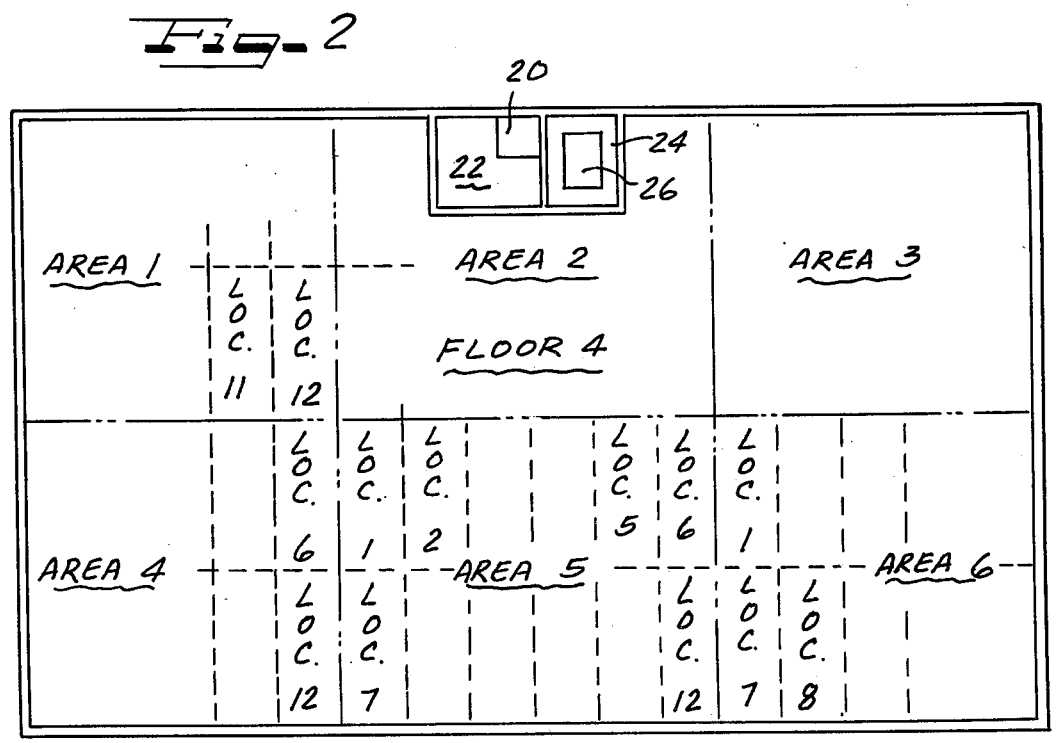
FIG. 2 is a plan view of one floor of the office building illustrated in FIG. 1.

A previously stated, a single customer may have all or a portion of a floor. The possibility of several customers sharing a floor is illustrated in FIG. 2 wherein six customers are located in AREA 1—AREA 6. Each area has been divided into twelve different key telephone locations, i.e. offices, desks, etc, which may be numbered continuously or within an area, such as LOC. 1—LOC. 12 as illustrated in FIG. 2.

Heretofore, if a customer having AREA 5 moved into additional space in AREA 6, and merely added additional instruments, it was necessary to manually connect those instruments to the terminal blocks in the riser closets, with respect to physical location and the type of key telephone service to be made available to the personnel using the additional instruments. If, however, the person in location LOC. 1 of AREA 5 is relocated to the location LOC. 7 of AREA 6, and is to maintain the same directory numbers and key telephone functions, it was necessary to disconnect his former telephone at the terminal blocks and reconnect a telephone at a different location on the terminal blocks with respect to both function and location. The plug-in connections provided by the modular interchange termination system of the present invention makes such moves simple and easy to perform.

Referring to FIGS. 3-9, the apparatus for constructing a modular interchange termination system according to the invention is illustrated at 26 as comprising a frame 28 which supports a plurality of modules 30, additionally referenced $30_1$—$30_8$. Each of the modules includes a front panel 32 having a pair of slots 34 at the top and bottom thereof to receive screws 36 for mounting the modules to the frame 28.

The termination system 26 includes a rear cover 38 which is secured to the frame 28 at one end by screws 40 and at the other end preferably by a hinge arrangement (not shown). A front cover (not shown) is also provided and has a hinge connection 42.

A conductor channel 44 is provided on the front lower part of the termination system 26. This channel has openings in the upper side for receiving the plug-in conductors so as to maintain these conductors in a neat arrangement whereby they extend generally vertically along but do not criss-cross across the front of the termination system.

A plurality of contact circuits are arranged in horizontal and vertical rows in the front panel 32. Each of these contact circuits comprises a colored contact bushing 46 in which is mounted a contact having a female contact member 48 at one end and a contact member 50 at the other end, here illustrated in the form of a wire wrapping post. In order to multiple the incoming line connections from a red field to a blue field, the contact members 50 of a horizontal row of a red field may be connected together, as illustrated by the bus 52 in FIG. 5 and as schematically illustrated in FIG. 10.

Each of the contact members 50 is connected by an electrical conductor 54 to an individual mating contact of a connector unit 56 which is matable with and separable from a connector unit 58. The connector unit 58 extends the individual circuit connections to the particular associated equipment by way of a multi-conductor cable 60.

The module 30 further comprises a back plate 62 which is spaced from and secured to the front panel 32 by means of a plurality of spacer studs 64 and pairs of fastening devices, such as screws 66 and 68. The back panel 62 also includes a pair of openings 78 which receive portions of the connector units 56, the connector units 56 being attached to the back plate 62 by means of screws 76.

The back plate 62 also includes first and second pairs of slots 70 for receiving the legs of a C-shaped cable clamp 72, the clamp 72 having turned-back ends 74 to retain the clamp in place.

Referring to FIGS. 5 and 9, interconnection of the green, red and blue fields is accomplished by plug-in conductor assemblies of which the assembly 80 is a typical representation. These assemblies may include different numbers of contacts, as the particular application dictates. Typically, however, each comprises a pair of plugs 82 and 84 having the required numbers of pins 86. In a preferred form of the invention the plugs 82 and 84 are each provided with six pin contacts so as to permit quick and easy transfer of all line functions, except ringing for a key telephone, the ringing function in most cases being common for a station. The pins 86 are received in and make electrical contact with the female contact members 48 mounted on the front panel 32, as illustrated in FIG. 5. As will be understood from the description relating to FIG. 10, this facility for programming and altering connections between the green, red and blue fields, gives the modular interchange termination system a high degree of flexibility in providing individualized key telephone service.

Referring to FIGS. 3, 6–8 and 10, each of the modules carries an indicia 88 on the front panel 32 and a corresponding indicia 90 on the back plate 62 in the form of color coding. In addition, the contact bushings 46 of each panel are formed of colored insulation material and arranged in the same pattern for each type of field.

More specifically, the indicia 88 in green identifies the module from the front and from the rear as constituting a green field. Similarly, the red and blue indicia identify the modules as red and blue fields. An installer, or other service personnel, will therefore recognize the type of field at a glance. The indicia 88 and 90 have been additionally referenced G, R, BL to indicate the colors green, red and blue, respectively.

The colored contact bushings identify respective incoming lines and functions associated with the incoming lines. The contact bushings 46 are arranged in horizontal and vertical rows. The colors are in patterns with each bushing of a horizontal row being of the same color as the other bushings of that particular row. In FIG. 7, color references have been placed to the left and to the right of the contact bushings to indicate the colors of the bushing material of the adjacent row. In FIG. 7 these colors are white W, red R, black BK, yellow Y, purple P, blue BL, orange O, green G, brown BR and slate S. In observing the left-hand color references, there are, in this particular illustrative embodiment, five patterns of white, red, black, yellow and purple coded with each other in pairs corrsponding with the coding of the 25 pairs of the raw cable, which identify five central office lines, as can be seen by comparing FIG. 7 as a red field with the red field module 30 of FIG. 10. Alternate horizontal rows identify key telephone functions and, as can be seen on the right-hand side of FIG. 7, constitute a repetitive color pattern. Each function indicia identified by the bushing colors, together with each line identification indicia, identifies each line and all of the functions available for that line. In comparing the color indicia of FIG. 7 with the line and function indicia of the red field in FIG. 10, it is apparent that for the upper central office line that the tip T and ring R conductors are connected to the contacts of the first white W and first blue BL rows. Likewise, the first line $T_1$ and ring $R_1$ conductors are connected to the contacts of the second white W and first orange O rows; the hold function conductors A and $A_1$ are connected to the contacts of the third white W and first green G rows; the lamp conductors L and LG and connected to the contacts of the fourth white W and first brown BR rows; and the ringer or bell conductors B and BG are connected to the contacts of the fifth white W and first slate S rows. As is well known in the art, the bell for a key telephone may be used in common with several incoming subscriber lines, with line identification at the key telephone being provided by a lamp; therefore, it is not necessary to provide a telephone with the conductors B and BG for each subscriber line, as seen by the two conductor patch cords $80_B$ in FIG. 10 which parallel the B and BG terminals of each key set. Also, additional functions may be provided, as is well known in the art, by the switching and signaling equipment and relative contacts may be provided for utilization of these functions between the switching and signaling equipment and the key telephones.

Referring to FIG. 10, an exemplary embodiment of the connection and operation of a modular interchange termination system according to the present invention is schematically illustrated. The incoming lines at 12 are connected to a terminal block 16 for distribution to the various customers on different floors of an office building. The lines L1--L6 which are to serve a customer on a particular floor are connected to contacts of a green field by way of a separable connector 92. If a plurality of customers are located on the same floor, as illustrated in FIG. 2, the subscriber lines for these customers are also routed to the green field. Inasmuch as generally only two contacts per line, say line L6, are required, a single green field with many contacts, as illustrated in FIG. 8, for example, can serve 150 incoming lines. Inasmuch as a blue field module is identical to a green field module, a vertical row or rows which may be available on a blue field may be used in place of a green field and provide a saving in equipment and space. This is schematically illustrated by the broken lines 94 and 96, wherein the subscriber lines L1--L6 are extended to a free vertical row of contacts of the blue field (referenced 94), one of the connectors on the rear side of the blue field constituting the connector 92. The subscriber lines may then be extended to the red field by plug-in connections between the contacts of the "vertical green row" and the appropriate positions on the red field. When this is done, the connector which extends the incoming lines to the vertical green field row is provided with a green indicia. The vertical green row may also be provided with such an indicia for ease of identification.

The individual subscriber line L1--L6 are extended to the red field by one of the aforementioned techniques. It will be noted in FIG. 10 that the red field of the exemplary embodiment can only serve five incoming subscriber lines; therefore, additional red fields may be provided, as indicated by the red field 30 (R). This additional red field may be interconnected with the same blue field served by the other red field, or may be used in conjunction with an additional blue field, as indicated by the field 30 (BL), depending on the number of key telephones to be served.

Focusing attention again to the central portion of FIG. 10, the subscriber lines L1--L6 are extended to the associated rows of contacts in the white W, red R, black BK, yellow Y and purple P groups of rows. As can be seen in FIG. 10, these are the upper two rows of contacts. These connections are extended by way of the conductors (54, FIG. 4) collectively designated 98 and a separable connector 100, constituted by the connectors on the rear plate of a red field module, to the switching and signaling equipment 102. The switching and signaling equipment 102 for key telephone systems, is well known in the art. For example, such equipment is manufactured by Northern Electric Company, Limited, in various models of different line capacity. This equipment is identified through the manufacturer as QPC panels and identified by model numbers including QPC 11A, 12A and 13A.

The function connections associated with, for example, lamp, bell, holding and the like are extended from the switching equipment, again by the connector 100, to the contacts associated with those functions, as particularly identified by the indicia orange O, green G, brown BR and slate S, in conjunction with the group indicia of white, red, black, yellow and purple. It should be particularly noted that the switching and signaling equipment 102 for a floor is located immediately adjacent the modular interchange termination system for that floor. This is of particular importance because of the savings involved in running multi-conductor cables from the separable connectors at the rear of a red field.

The function conductors, for example for speech ($T_1$, $R_1$), holding and transfer (A, $A_1$), lamp (L, LG) and bell (B, BG) are connected from the red field to the blue field by the plug-in jumper connections 80.

Only one vertical row of the blue field has been illustrated in any particular detail in that similar connections may be provided for the other rows of the blue field; however, a simplified illustration of the jumpering which may be involved to provide service of subscriber line L3 to the telephone connected to the second vertical row of the blue field is illustrated by the connection 106 associated with the key telephone 106 as explained hereinbelow.

Each of the key telephones of a particular floor of the building, here key telephones 104--110 being illustrated, is associated with and electrically connected to the contacts of a vertical row on the blue field. The blue field module, of course, carries the same color indicia as the other fields to identify subscriber line and function. Therefore, each vertical row of a blue field associates and identifies a particular key telephone with each subscriber line to which the key telephone has access and with each function available to that key telephone.

As set forth, each vertical row of contacts of a blue field is terminated in a separable connector which is advantageously mounted at the rear of the blue field. These connectors (56, 58) extend the telephone connections to the individual key telephones 104--110 by way of the aforementioned raw cable, to a termination block or other separable connector 114--120 for connection to the flexible multiconductor cables of the telephone instruments.

At this point, the complete flexibility of the modular interchange termination system becomes apparent. First of all, the separable connectors 56, 58 define a quick change termination zone by which personnel may be relocated and maintain the same key telephone service previously enjoyed. For example, if the personnel which man the key telephones 104 and 106 exchange physical locations on the floor, it is a simple task to provide each with the same telephone service by interchangeably disconnecting and reconnecting their separable connectors. This means that customers may relocate personnel on the same floor with no difficulty in retermination of the key telephones, including those situations where a customer may expand his facilities and take additional floor space previously occupied by another customer.

Secondly, the accessibility to different lines and different functions may easily be handled by reprogramming the plug-in connections between the red field and the blue field. Therefore, the system is completely flexible with respect to personnel additions, subtractions, relocations and line and function access.

In summary, the modular interchange termination system of the present invention provides many advantages, particularly in connection with key telephone systems in office buildings. These advantages include less installation time and space, shorter runs of multi-conductor cable, complete flexibility in function programming and telephone instrument termination, and readily identifiable relationships between central office lines, telephone functions, and telephone served by and having access to the central office lines.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:
1. Programmable electrical connector apparatus comprising:
    a plurality of first electrical contacts, each of said first electrical contacts including an active portion for mating engagement with a complementary patchcord connector contact, and a tail portion;
    mounting means supporting said first contacts in rows; and
    a plurality of like electrical connector units mounted on said mounting means, each of said connector units including a plurality of second electrical contacts, each of said second electrical contacts including an active portion for mating engagement with a complementary contact of a complementary mating connector and a tail portion, said tail portions of said second contacts of said electrical connector units connected to respective tail portions of at least one row of said first contacts, selective interchange of patchcord connectors programming selected electrical paths through said apparatus and selective interchange of complementary mating connectors providing simultaneous reprogramming of pluralities of the paths programmed by the patchcord connectors.

2. Programmable electrical connector apparatus according to claim 1, wherein said mounting means comprises: a panel with said first contacts mounted therein with at least the tail portions exposed, said panel mounting said connector units spaced from said first contacts.

3. A modular interchange termination system for selectively and alterably interconnecting a plurality of key telephones with a plurality of central office telephone lines through key telephone switching and function signaling equipment, comprising:

a first contact module including a plurality of first electrical contacts arranged in first rows and second rows, the first electrical contacts of said first rows including active portions adapted for connection to respective telephone lines and tail portions;

electrical connection means for connecting said tail portions of said first contacts of said first and second rows to the key telephone switching and function signaling equipment which is operable to associate said telephone lines and key telephone function signals with said first contacts of said second rows;

a second contact module including a plurality of second electrical contacts arranged in third rows each of said second electrical contacts including an active portion and a tial portion;

first programmable interconnection means including a plurality of interchangeable electrical connectors mounted adjacent said second electrical contacts and connecting said tail portions of said second contacts of a third row to a respective key telephone; and second programmable interconnection means for selectively and alterably connecting said active portions of selected first contacts of said second rows to said active portions of selected second contacts of said third rows to selectively and interchangeably associate key telephones with telephone lines and key function signals.

4. An interchange termination system for interconnecting incoming telephone lines to key telephones located on the same floor of a building via switching and signaling equipment, comprising:

a plurality of first contacts arranged in first rows, each of said first contacts including an active portion and a tail portion, said active portions of at least some of said first contacts of some of said first rows adapted for connection to respective incoming telephone lines with the corresponding tail portions connected to the switching and signaling equipment, and said tail portions of others of said first contacts of others of said first rows connected to said switching and signaling equipment for the transmission of key telephone function signals to be associated by the switching and signaling equipment and said some first contacts with respective incoming telephone lines;

a plurality of second contacts arranged in second rows, each of said second contacts including an active portion and a tail portion;

means for supporting said plurality of first contacts and said plurality of second contacts;

a plurality of electrical connectors, each of said connectors including a first part having contacts, each of said contacts including an active portion, and a tail portion connected to said tail portions of said second contacts of a respective second row of contacts, said first part mounted on said support means at a location which identifies the respective second row of contacts, and a mating second part having contacts electrically connected to a respective key telephone, said second parts of each of said electrical connectors interchangeable with each other in mating with said first parts to provide relocation of key telephone service without relocation of a key telephone; and programming means for establishing electrical interconnections between said others of said first contacts and said second contacts for selective rapid association and disassociation of a key telephone with incoming telephone lines and the key telephone functions corresponding to the telephone lines.

5. A modular interchange termination system for selectively and alterably interconnecting a plurality of key telephones with a plurality of central office telephone lines through key telephone switching and function signaling equipment, comprising:

a first contact module including a plurality of first electrical contacts arranged in first rows and second rows, the first electrical contacts of said first rows adapted for connection to respective telephone lines;

a first mating electrical connector mounted on said first contact module and connecting said first contacts of said first and second rows to the key telephone switching and function signaling equipment which is operable to associate said telephone lines and key telephone function signals with said first contacts of said second rows;

a second contact module including a plurality of second electrical contacts arranged in third rows;

connection means including a plurality of second mating electrical connectors each connecting said second contacts of a third row to a respective key telephone and each mounted on said second contact module at a location which identifies the respective third row of contacts; and programmable interconnection means for selectively and alterably connecting selected first contacts of said second rows to selected second contacts of said third rows to selectively and interchangeably associate key telephones with telephone lines and key function signals.

6. An interchange termination system for interconnecting incoming telephone lines to key telephones located on the same floor of a building via switching and signaling equipment, comprising:

a plurality of first contacts arranged in first rows, at least some of said first contacts of some of said first rows adapted for connection to respective incoming telephone lines and to the switching and signaling equipment, and others of said first contacts of others of said first rows connected to said switching and signaling equipment for the transmission of key telephone function signals and associated by the switching and signaling equipment and said some first contacts with respective incoming telephone lines;

a plurality of second contacts arranged in second rows, at least a portion of said second contacts of a second row connected to at least one key telephone;

means for supporting said plurality of first contacts and said plurality of second contacts;

a plurality of electrical connectors, each of said connectors mounted on said support means and including a first part having contacts connected to said second contacts of a respective second row of contacts and a mating second part having contacts connected to a respective key telephone, said second parts of each of said electrical connectors interchangeable with each other to provide relocation of key telephone service without relocation of a key telephone; and programming means for establishing electrical interconnections between said others of said first contacts and said second contacts for selective rapid association and disassociation of a key telephone with incoming telephone lines and the key telephone functions corresponding to the telephone lines.

7. A system according to claim 6, wherein the building having the floor served by said interchange termination system comprises a plurality of additional floors each served by a like system with the respective switching and signaling equipment for each floor being adjacent a riser intercommunicating all of said floors.

8. A modular interchange termination system for selectively and alterably interconnecting a plurality of key telephones with a plurality of central office telephone lines through key telephone switching and function signaling equipment, comprising:
a first contact module including a plurality of first electrical contacts arranged in first rows and second rows, the first electrical contacts of said first rows adapted for connection to respective telephone lines;
a first separable electrical connector connecting said first contacts of said first and second rows to the key telephone switching and function signaling equipment which is operable to associate said telephone lines and key telephone function signals with said first contacts of said second rows;
a second contact module including a plurality of second electrical contacts arranged in third rows;
connection means including a plurality of second separable electrical connectors mounted adjacent said second contact module and connecting said second contacts of a third row to a respective key telephone; and
programmable interconnection means for selectively and alterably connecting selected first contacts of said second rows to selected second contacts of said third rows to selectively and interchangeably associate key telephones with telephone lines and key function signals.

9. A modular interchange termination system according to claim 8, comprising:
support means for supporting said first and second contact modules and said first and second electrical connectors adjacent the respective modules.

10. A modular interchange termination system according to claim 9, comprising support means including a frame, wherein each of said first and second contact modules comprises a front panel mounted on said frame, said first and second electrical contacts carried by the respective front panel, and a back panel spaced from and secured to said front panel, said first electrical connector mounted on said back panel of said first contact module and said second electrical connectors mounted on said back panel of said second contact module.

11. A modular interchange termination system according to claim 9, wherein said second separable connectors comprise a plurality of mutually interchangeable other electrical connectors each having a first connector part with connector contacts connected to said second contacts and a second part with connector contacts connected to a respective key telephone, interchanging of said first connector parts effective to relocate key telephone service of the respective key telephones.

12. A modular interchange termination system according to claim 11, comprising:
support means for supporting said first and second contact modules, the first-mentioned electrical connector and said other electrical connectors to define termination zones at said termination system between said first contact module and the switching and signaling equipment and between said second contact module and the key telephones.

13. A modular interchange termination system according to claim 11, comprising:
support means including a frame;
and wherein said first contact module comprises:
a first front panel mounted on said frame, said first electrical contacts carried by and extending through said first front panel, and a first back panel spaced from and secured to said first front panel, the first-mentioned electrical connector mounted on said first back panel; and wherein said second contact module comprises:
a second front panel mounted on said frame, said second electrical contacts carried by and extending through said second front panel, and a second back panel spaced from the secured to said second front panel, said plurality of other electrical connectors mounted on said second back panel.

14. A modular interchange termination system for selectively and alterably interconnecting a plurality of key telephones, through key telephone switching and function signaling equipment, with a plurality of central office telephone lines connected to a terminal block, said system comprising:
a first connection field including a plurality of first electrical contacts arranged in first rows and second rows, the first electrical contacts of said first rows adapted for connection to respective telephone lines;
first mating electrical connector means mounted adjacent said first connection field and connecting said first contacts of said first and second rows to the key telephone switching and function signaling equipment which is operable to associate said telephone lines and key telephone function signals with said first contacts of said second rows;

a second connection field including a plurality of second electrical contacts arranged in third rows;

second mating electrical connector means mounted adjacent said second connection field and connecting said second contacts of a third row to a respective key telephone;

a third connection field including a plurality of third electrical contacts;

means connecting the telephone lines to corresponding ones of said third electrical contacts, including third mating electrical connector means mounted adjacent said third connection field and connected between the terminal block and said third electrical contacts;

means connecting predetermined ones of said first contacts of said first rows to predetermined ones of said third contacts; and programmable interconnection means for selectively and alterably connecting selected first contacts of said second rows to selected second contacts of said third rows to selectively and interchangeably associate key telephones with telephone lines and key function signals.

15. Interconnection apparatus for use in selectively interconnecting a plurality of multiconductor telephone service lines with a plurality of multiconductor telephone substation lines each of which has a respective first mating connect unit at one end thereof and a respective multiline telephone substation at the other end thereof, each of the first mating connector units having mating contacts connected to respective conductors of a substation line, said apparatus comprising:

a first panel including a contact mounting portion and a second panel including a connector mounting portion spaced from said contact mounting portion of said first panel;

a plurality of interconnection contacts supported by said first panel in rows extending in first and second directions, each of said interconnection contacts including means for electrically connecting the same to a respective conductor of a telephone service line;

service line identification means carried by said first panel adjacent said interconnection contacts including first means identifying separate contact groups in a row of the first direction with a separate service line and identifying corresponding contact groups in each row in the second direction with corresponding service lines thereby automatically identifying each appearance of a service line connected to said interconnection contacts; and a plurality of mutually interchangeable second mating connector units supported by said second panel for mating with the first mating connector units, each of said second mating connector units including mating contacts connected to respective interconnection contacts of a respective row extending in the first direction for connecting the respective substation to each telephone service line having a line appearance in that row.

16. Interconnection apparatus for use in interconnecting a plurality of two conductor telephone lines with a plurality of multiconductor telephone service line groups via switching and signaling function equipment, said apparatus comprising:

a plurality of groups of contacts, the contact groups supported in alignment next to each other;

each of said contact groups comprising at least one pair of first interconnection contacts each of which includes means for connection to respective conductors of a respective telephone line, and a plurality of second interconnection contacts arranged in rows with each of said second interconnection contacts including means for connection to a respective conductor of a multiconductor telephone service line group, each of said second interconnection contacts connected to each other second interconnection contact of the same row to provide a multiple appearance availability for connection to more than one multiconductor service line group;

identification means adjacent each of said contact groups for identifying and associating each contact group with a telephone line and the service line groups; and at least one separable electrical connector including first and second mating connector units each having mating contacts, said first connector unit mounted adjacent said groups of interconnection contacts, said mating contacts of said first connector unit respectively connected to said first interconnection contacts and to at least one second interconnection contact of each row, and said mating contacts of said second connector unit including means for connection to the switching and signaling function equipment.

17. The interconnection apparatus according to claim 16, comprising:

a first panel supporting said interconnection contacts and said identification means;

a second panel spaced from and connected to said first panel, said first connector unit mounted on said second panel; and electrical connections between said mating contacts of said first connector unit and said interconnection contacts extending in the space between said first and second panels.

18. The interconnection apparatus according to claim 17, wherein said identification means comprises a plurality of color coded insulators mounting respective interconnection contacts in said first panel.

19. Interconnection apparatus according to claim 16, wherein said means for each of said second interconnection contacts for connecting the same to a conductor of a telephone service line group comprises a female receptacle portion of the respective contact.

20. Interconnection apparatus according to claim 19, wherein each of said interconnection contacts extends through said first panel and includes a terminal portion connected to a mating contact of said first connector unit, and a plurality of shorting bars connecting the terminal portions of the second interconnection contacts of respective rows of said second interconnection contacts.

21. Programmable electrical connector apparatus comprising:

a plurality of first electrical contacts, each of said first electrical contacts including an active portion for mating engagement with a jumper conductor and a tail portion;

mounting means supporting said first contacts in rows; and a plurality of like electrical connector units mounted on said mounting means, each of said connector units including a plurality of second electrical contacts, each of said second electrical contacts including an active portion for mating engagement with a complementary contact of a complementary mating connector and a tail portion, said tail portions of said second contacts of said electrical connector units connected to respective tail portions of at least one row of said first contacts, selective interchange of jumper conductors programming selected electrical paths through said apparatus and selective interchange of complementary mating connectors providing simultaneous reprogramming of pluralities of the paths programmed by the jumper conductors.

22. Interconnection apparatus comprising:

a contact array including a plurality of first electrical contacts in rows and each including a matable active portion and a tail portion;

a first panel including a front side and a rear side and supporting said first contacts with said active portions accessible from said front side and said tail portions extending from said rear side;

color coding means carried by said first panel adjacent to and identifying each of said first contacts;

a second panel spaced apart from and secured to said first panel and including a front side facing said rear side of said first panel, and a rear side;

a plurality of matable electrical connector units, each of said connector units including second electrical contacts, each of said second contacts including a matable active portion and a tail portion, said connector units extending through and supported by said second panel with said mating active portions of said second contacts accessible from said rear side of said second panel and said tail portions extending from said front side of said second panel.

said tail portions of said second contacts of each of said electrical connector units electrically connected to said tail portions of said first contacts of at least one row of said first contacts in the space between said panels to electrically associate each connector unit with specific ones of said first contacts.

23. The interconnection apparatus according to claim 22, wherein said color coding means comprises:

colored insulators each having a contact passageway therethrough and each mounting a respective first contact in said passageway.

24. The apparatus of claim 21 wherein said first contacts form a connection field and wherein said mounting means comprises field identification indicia.

25. The apparatus of claim 24, wherein said mounting means includes a front side and a rear side, and wherein said field identification indica is carried on the front side and on the rear side.

26. The apparatus of claim 21, wherein said active portions of said first contacts are female contact portions and receive the jumper conductors in plug-in fashion.

* * * * *